United States Patent

Paolone

[11] Patent Number: 5,857,506
[45] Date of Patent: Jan. 12, 1999

[54] REPLACEABLE INSERT CUTTING TOOLS

[76] Inventor: Sandro Paolone, 2906 N. Buena Vista, Burbank, Calif. 91504

[21] Appl. No.: 900,198

[22] Filed: Jul. 25, 1997

[51] Int. Cl.$^6$ ................................................ B27G 13/00
[52] U.S. Cl. .......................... 144/230; 144/218; 144/174; 241/292.1; 407/49
[58] Field of Search .......................... 403/377; 241/292.1; 144/218, 229, 230, 241, 239, 172, 173, 174; 407/44–49, 108, 113

[56] References Cited

U.S. PATENT DOCUMENTS

| | | | |
|---|---|---|---|
| 2,632,536 | 3/1953 | Skeel .......................................... | 407/49 |
| 3,032,152 | 5/1962 | Titsler ........................................ | 407/49 |
| 3,408,722 | 11/1968 | Berry, Jr. .................................. | 407/49 |
| 3,467,416 | 9/1969 | Gourley ................................... | 144/230 |
| 3,742,565 | 7/1973 | Boboltz et al. ............................ | 407/49 |
| 4,830,073 | 5/1989 | DeAbreu .................................. | 144/230 |
| 5,240,192 | 8/1993 | Tilby et al. .............................. | 144/230 |
| 5,558,142 | 9/1996 | Ehrle et al. .............................. | 144/230 |

OTHER PUBLICATIONS

Oertli, Pro–Vit advertisement brochure.
Leuco Precision Tooling, "Super Profiler™" advertisement.
Wisconsin Knife Works, pages of product brochure.

*Primary Examiner*—W. Donald Bray
*Attorney, Agent, or Firm*—Merchant, Gould, Smith, Edell, Welter & Schmidt

[57] ABSTRACT

The present invention provides a replaceable insert cutting tool combination. The combination comprises a cutter head having at least one peripheral transverse indentation and being rotatable about an axis, the cavity including a knife support wall at least partially transverse to the cutter head periphery, and at least one threaded bore substantially parallel to the knife support wall. The combination further comprises a knife element disposed adjacent the knife support wall and having an edge extending from the indentation, in addition to at least one threaded element for engagement in the threaded bore. At least a pair of wedging elements are mounted adjacent the knife element in engaging side-by-side relation in the indentation. One of the wedging elements receives the at least one threaded element and is movable in toward the cutter head therewith, and at least one of the wedging elements is positioned to move the knife element toward the knife support wall when the threaded element is increasingly engaged in the threaded bore. The threaded element and associated wedging element are arranged to be extractable together, so that lateral locking forces can be overcome by torquing action on the threaded element.

19 Claims, 5 Drawing Sheets

REPLACEABLE INSERT CUTTING TOOLS

FIELD OF THE INVENTION

This invention relates to replaceable cutting tools, and more particularly to replaceable insert cutting tools for woodworking cutter heads, which cutting tools can be firmly supported but readily removed or replaced with respect to the cutter heads.

BACKGROUND OF THE INVENTION

Specialized cutting tools which rapidly shape a simple or complex profile into the surface of elongated wood stock have been in use for many years. For example, edge details, panels, tongues, grooves, and other complex profiles are formed in wood by rotating cutter heads or bodies having transverse knife edges which shape the surfaces of moving stock during finishing operations. The cutting knives are formed or finished with the desired cutting edge profile and mounted, usually at a number of positions, in the periphery of the rotatable cutter body. The cutter body or head is mounted on a drive shaft, and then rotated at high speed about an axis transverse to the direction of stock movement so that the stock is profiled as it moves past the work station.

Obviously, the knife, which is usually a flat sided element, must be firmly held so that the shaped cutting edge is precisely positioned despite the recurring impacts encountered during high speed operation. If this is not done, the milled stock will not be held within tolerances and knife edge will wear too rapidly or the knife must even come loose.

When the knife edge wears to a degree at which it must be replaced, replacement should be quick and precise. In addition, it is also advantageous to have some adjustment capability, so that different knife thicknesses and knife shapes, within limits, can be used with a single cutter body, within limits.

The problem having existed for many years, a number of different approaches have been adopted for positioning and locking such replaceable insert cutting tools. Shaped receiving mounts or notches have been provided at regular intervals about the periphery of the cutter body, with one flat side of a knife being seated against one side wall of the receiving notch, and forced against that side wall by one or more set screws. The set screws act directly on the knife or against a knife gib that distributes force more equally. A commonly used technique is to mount the set screws so that they lie along a chord across the cutter body periphery, and intercept the knife or the knife gib approximately perpendicularly. Another approach is to use a split base supporting a cutting bit having angled planar surfaces which fit in the base in such fashion that when a clamping bolt is tightened, the tool is pulled firmly down into position. A number of systems use wedges together with complementary receiver mounts so as to provide increasing force as threaded elements are directed radially or partially tangentially into the body.

All of these arrangements involve at least some of the following disadvantages:

A. They may require extensive and costly machining of the cutter body.

B. They do not efficiently redistribute forces and may be too difficult to tighten and loosen.

C. They may incorporate an excessive number of parts and require too much handling to permit easy tool replacement.

D. They may require an excessive amount of precision machining.

E. They also require too much time to effect tool replacement.

F. They are not adequately adaptable to use with different knife shapes and thicknesses.

A unit which does not share all of these disadvantages and which has been used by Applicant in the past is one in which the retaining mount or pocket in the cutter head includes a threaded bore in its base, and has a pair of substantially parallel side walls, against one of which the knife is to be seated. A knife gib wedge acting against the knife at one side of the mount is itself acted against by a conic head on a retaining machine screw. The conic machine screw head is angled to match a diverging angle on the side of the knife gib. Thus as the retaining machine screw is driven into the threaded bore in the cutter body, increasing force is directed against the knife gib and hence the knife itself. While this functions in a satisfactory manner by comparison to other units, it requires maintenance of close tolerances on the knife gib and the conic head. Otherwise, it is difficult to establish a proper fit unless parts are selectively matched. Moreover, the reactive forces on the conic head, which presses against the knife gib, seek to tighten it against the support wall opposite to the knife. This is apt to result in galling of the surfaces, increasing the difficulty of knife removal and replacement. Also, the screw and gib have to be completely removed in order to replace a knife, since adequate clearance is not otherwise available.

It is therefore desirable to provide a single replaceable insert cutting tool combination which not only provides desirably firm seating under high force, but is amenable to ready replacement of the tool, while also permitting changes in knives and other parts of the assembly.

SUMMARY OF THE INVENTION

A replaceable insert cutting tool in accordance with the invention takes advantage of force leveraging in a manner which permits both firm locking and ready replacement. The receiver mount for an insert in a cutter head includes a generally concave receiving indentation, shaped with a first side wall for seating against one flat side of a knife, and an opposite side wall providing a support surface. A knife gib, having one planar surface engaging the flat knife side wall, and an opposite planar surface diverging away from the knife edge, is engaged by a pressure gib surface having a complementary side wall, and also having an opposite wall engaging the support surface of the receiver mount. A retaining screw through the pressure gib extends into the threaded bore in the cutter body. When the retaining screw is tightened axially into the bore in the body, the screw head seats in the pressure gib. Torque exerted in tightening the screw leverages into a greater downward force on the pressure gib, and the angled mating surfaces between the pressure gib and the knife gib then exert a further leveraged lateral force against the broad face of the knife. Concurrently, the pressure gib is backed by the opposite side wall of the receiver mount. Consequently, only the final tightening turns of the retaining screw are needed for secure retention of the knife. Similarly, relatively little loosening of the retaining screw is adequate to allow release and replacement of the knife. For these reasons also, a knife of different thickness can be installed, simply by changing the pressure gib, or the knife gib, or both.

Disassembly of the replaceable insert is greatly facilitated by securing the inserted retaining screw against axial outward movement relative to the pressure gib, although permitting turning movement. Thus, after the retaining screw has been tightened to provide high force loading for knife operation, the leveraged forces exerted to unthread the screw also act to move the pressure gib out, which is particularly needed under the high compressive forces that initially exist. Once these forces are relieved, much less force is needed to loosen the retaining screw. In addition, this arrangement unifies the screw with the pressure gib, simplifying the handling task for an operator and reducing the amount of time needed to insert or replace a knife. In one example, these functions are accomplished by incorporating an interior groove in the inner periphery of the bore of the pressure gib, just above the head of an inserted retaining screw. A snap ring inserted into the interior groove partly occludes the head of the screw, preventing egress while permitting rotational movement.

Further features of the invention include incorporation of a retention pin on the face of the knife gib, engaging a bore in the knife itself, to secure against knife movement and release. In addition, the inserted snap lock also prevents gradual disengagement of the retaining screw when in operation. A small pin on the wedge face of the pressure gib may fit into a facing slot and bore in the knife gib to prevent the units from separating, until desired, during disassembly.

Combinations in accordance with the invention facilitate usage of a number of variants which enable the system operator to achieve a unique degree of flexibility. Where the cutter head and knife have a wide span, two or more pressure gib and knife gib combinations may be used. Alternatively, a single pressure gib can receive two or more retaining screws. With an appropriate receiving mount a back support plate can be inserted between the knife element and the knife support wall, enabling different combinations of knives and back supports to be used. In addition, the facing surfaces may have matching corrugated or serrated patterns, so as to increase retentive capability considerably. Where the knife element is of substantial height, the pressure gib can be arranged to exert lateral force against its mid-region, minimizing the danger of edge forces causing twisting. In addition, the knife element can have oppositely disposed cutting edges and be reversible in the insert.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
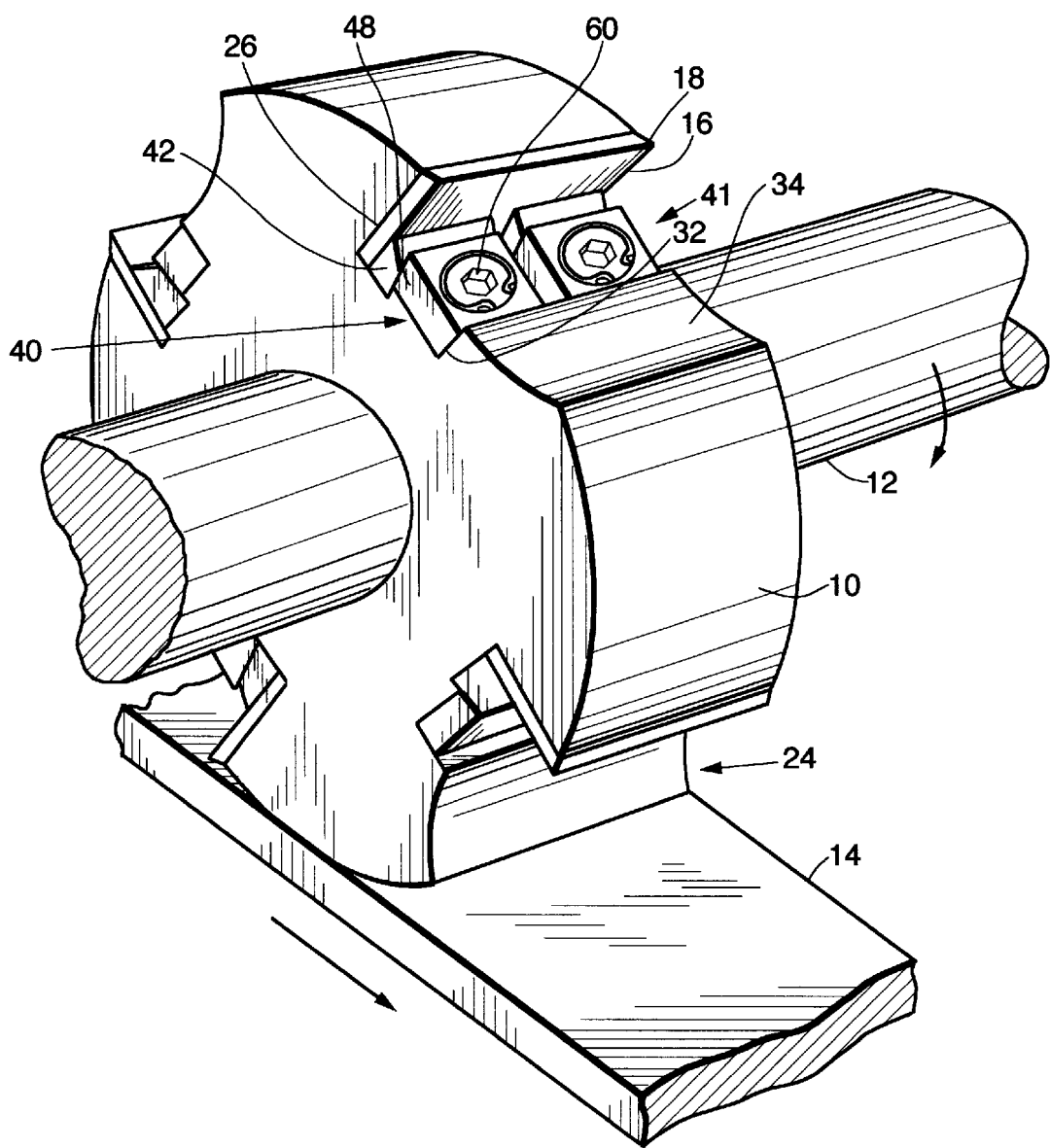
FIG. 1 is a perspective view of a replaceable insert cutting tool in accordance with the invention, as mounted in a cutter body.
Figure 2:
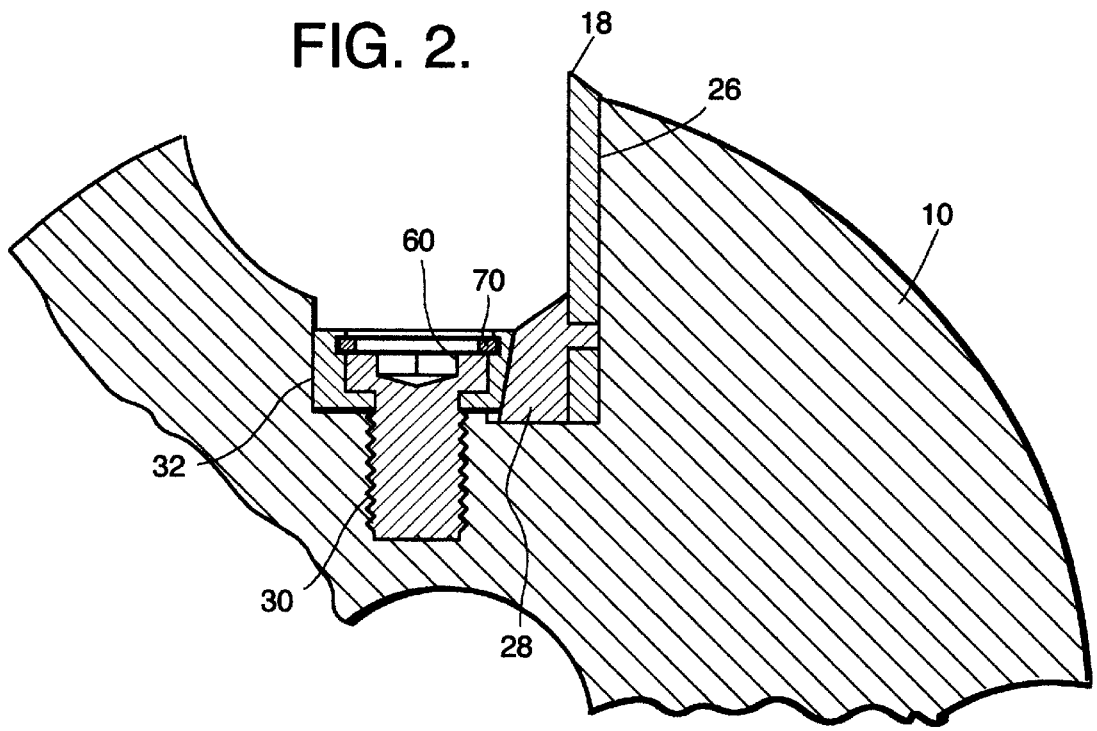
FIG. 2 is a fragmentary side sectional view of the replaceable insert cutting tool assembly of FIG. 1.
Figure 3:
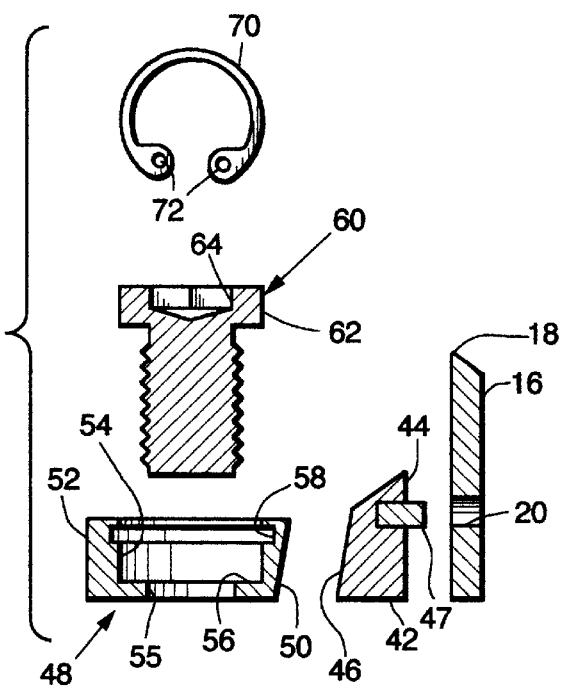
FIG. 3 is an exploded view of the elements of the replaceable insert cutting tool of FIGS. 1 and 2.
Figure 4:
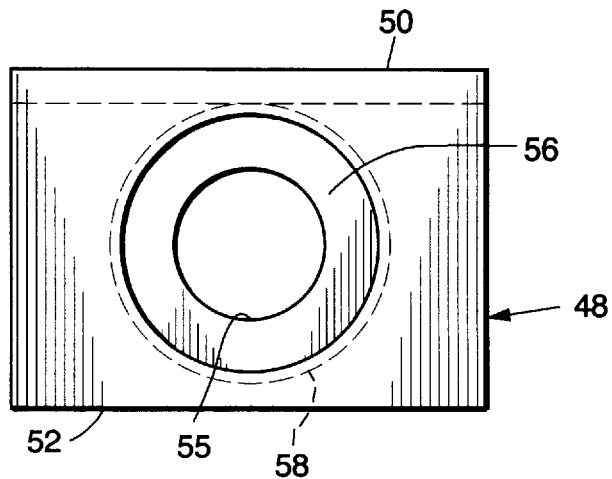
FIG. 4 is a top view of a pressure gib used in the combination of FIGS. 1—3.

An example of the invention is given as applied to the woodworking industry, although like combinations may be used in other instances for replaceable insert cutting tools, as with machine tools. In the present example, referring now to FIGS. 1–3, a cutter head or body 10 is mounted on a rotatable drive shaft 12 and its periphery rotates in a given plane, along which a piece of wood stock, such as a strip, panel or board 14 is moved longitudinally. Peripheral knives 16, here shown as linear cutting elements, cut a chosen transverse profile in the stock 14. There are typically three or four knives 16 disposed in the periphery of the cutter head 10, each having a knife cutting edge 18 that protrudes from the cutter head 10 periphery. Each knife 16 typically has flat broad faces and may conveniently have oppositely disposed cutting edges (not shown) so that when one cutting edge wears, the knife need merely be reversed. As seen in FIG. 2 and 3, the knives each include a positioning hole 20 which may be engaged by a positioning pin, described below, in an adjacent gib.

The cutter head 10 includes a number of retainer mounts 24 or pockets forming shaped concavities at each of the peripheral positions at which a knife is to be mounted. In the example shown on FIGS. 1–3, the retainer mounts 24 each include a generally concave indented profile across its lateral width for receiving the replaceable insert cutting tool. In this indented profile, the trailing edge in the direction of rotation includes a knife support wall 26. The U-shaped portion also includes a base 28 having a step contour, with the deepest portion of the base 28 being adjacent the knife support wall 26. The upper level of the step-shaped base 28 encompasses a threaded bore 30 extending into the cutter head 10. A back support wall 32 parallel to the knife support wall 26 extends outwardly from the base 28 to a predetermined height, where a curved profile 34 that provides clearance for manipulation of replaceable insert elements forms a leading edge for the mount 24.

The replaceable insert cutting tool assembly is mounted solely within the retainer mount 24. Here, because the lateral dimension of the body 10 and the knife 16 are so wide that two tool assemblies 40, 41 are used in parallel. The following description of one applies to the other as well. A knife gib 42 or 43 adjacent the knife 16 has a planar knife-engaging face 44 pressing directly against the planar face of the knife 16. On its opposite side, the knife gib 42, 43 has a planar wedge face 46 that diverges in the direction away from the knife cutting edge 18. The angle of divergence between the plane of the knife side walls and the wedge face is in the range of 10°–15°, here being about 13°, although other angles may be used, depending upon size and force relationships. A positioning pin 47 in the knife-side face 44 seats in the positioning hole 20 in the knife 16 in the assembly.

Adjacent the knife gib 42 or 43 is a pressure gib 48 or 49 that here has a substantially rectangular outline, in plan view. The outer profile has two oppositely disposed, load bearing planar faces 50, 52, and includes transverse, load transmitting side walls. A first angled planar face 50 is complementary to the angled wedge face 46 of the knife gib 42 or 43 substantially throughout its entire area. The opposite side of the pressure gib 48 is a planar support face 52 that engages the back support wall 32 of the retainer mount 24. The sides of the pressure gib 48 that extend between the knife gib and the back support wall are force absorbing columns which can be dimensioned to absorb the expected force magnitude.

The interior of the pressure gib 48 or 49 includes a centered cavity 54 leading to a through hole 55 in the lower surface that is substantially coextensive with the threaded bore 30 in the retainer mount 24. When the pressure gib is in position, a seating or force absorbing surface 56 about the through hole 55 absorbs axial stresses exerted when the unit is tightened in position. At a selected height above the seating surface 56 is an internal circumferential lock groove 58 that is adjacent or at the upper periphery of a retaining cap screw 60. The cap screw 60 has a low profile head 62 of known height, which includes an internal socket 64, here hexagonal, for tightening or releasing a threaded screw 66 that extends into the threaded bore 30 in the base of the retainer mount 24. When the cap screw 60 is fully in position, an open loop lock or snap ring 70 mating within the interior lock groove 58 in the pressure gib 48 or 49 can be inserted. The lock ring 70 partially occludes the head 62 of the cap screw 60, preventing outward axial movement but permitting rotation relative to the pressure gib 48. It also prevents loosening of the cap screw 60 under conditions of vibration. Lock rings 70 of different thicknesses may be used, as appropriate for a particular cap screw 60 height, in order to provide a firm fit.

In order to insert a replaceable knife 16 in the retainer mount 24, assume that the pressure gibs 48 and 49 are in position. Each retaining cap screw 60 is then threaded partially out from the mount 24 sufficiently to allow the pressure gibs 48 and 49 to be drawn upwardly from the base enough so that the knife gibs 42 and 43 and knife 16 may be inserted against the knife support wall 26. This can be done conveniently, since the positioning pin 47 in the knife gib 42 or 43 mates in the positioning hole 20 in the knife 16 and this combined unit can be manipulated with one hand. At the same time, the pressure gib 48 and retaining cap screw 60 are essentially inseparable, and held together relative to the bore 30. With the knife 16 and knife gib 42 in approximate position, torque on a socket wrench engaged in the hexagonal socket 64 of the cap screw 60 tightens the screw 66 in the bore 30, forcing the pressure gib 48 or 49 down toward the mount 24. This action transfers into lateral force against the knife gib 42 because of the complementary wedge face 46 and pressure gib planar face 50. The knife gib 42, seated along with the knife 16 at the lower portion of the step-shaped base 28, in turn thrusts laterally against the knife 16. Torque on the cap screw 60 uses the wedging action of the screw 66 threads to provide vertical force leverage which increases the lateral force on the knife 16. This lateral force is supported by the back support wall 32 of the mount on the opposite side of the pressure gib 48 or 49, through the side columns.

The downward force exerted by the underside of the head 62 of the retaining cap screw 60 is distributed across the seating surface 56 about the through hole 55, and also the lateral force is distributed about the entire planar wedge areas of the angled surfaces 46, 50. When a sufficient depth of penetration has been reached, the lock ring 70 can be inserted in the lock groove 58. Because the lock ring 70 spans the outer periphery of the cap screw head 62, it limits outward movement of the screw 60 without inhibiting turning motion, thus unifying the cap screw 60 and the pressure gib 48 until the lock ring 70 is removed. This arrangement also prevents loosening of the cap screw 60 under the substantial vibrational forces that are encountered. Pin holes 72 in the gapped ends of the lock ring 70 permit the lock ring to be squeezed with a pointed tool for insertion and removal.

Figure 5:
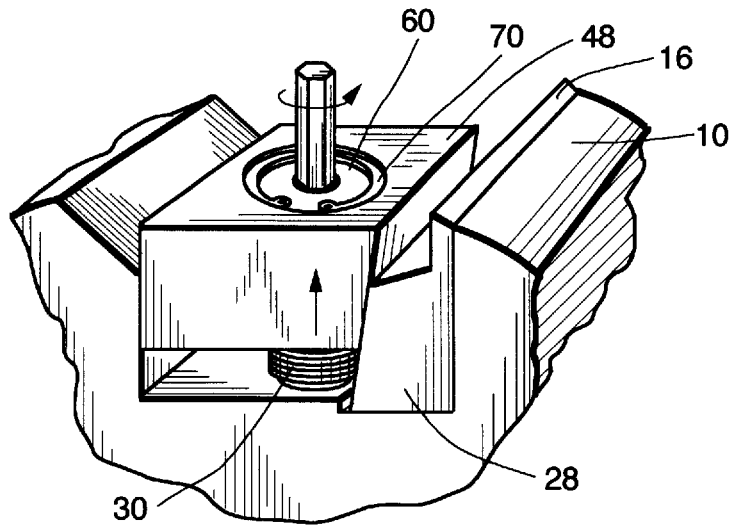
FIG. 5 is a fragmentary perspective view of the principal parts of the combination during disassembly.

When it is desired to release the insert tool, each respective cap screw 60 is unthreaded partially, sufficiently to permit the knife gibs 42 and 43 and the knife 16 to be separated, independently or together, from the mount 24. As seen in FIG. 5, which depicts a pressure gib 48 partly extracted from its pressure locked position, this action is greatly aided by the unification of the pressure gib 48 and the cap screw 60 by the lock ring 70. After adequate tightening during assembly, the lateral compressive forces acting on the pressure gib 48 are of such magnitude to restrain it firmly against release. However, as seen in FIG. 5, high torque can be exerted by a socket wrench to unthread the cap screw 60, breaking the locking forces, by drawing the pressure gib 48 upwardly relative to the knife gib 42. Thereafter, the cap screw 60 can be unthreaded with increasing ease to a position at which the associated knife gib 42 or 43 is freed of restraints. The knife gibs 42, 43 and knife 16 can be withdrawn out in the direction toward the knife edge, or separately and conveniently out the side of the cutter head 10, with new knife gib and knife elements being inserted in the same way.

As noted above, the sides of the pressure gib which are transverse to the pressure bearing faces 50, 52, form strong columnar elements that transfer force between these opposite faces. Distortion of the pressure gib when full loads are exerted is insufficient to introduce bearing forces on the cap screw head, so that no binding forces need be overcome when inserting or removing the cap screw.

Figure 7:
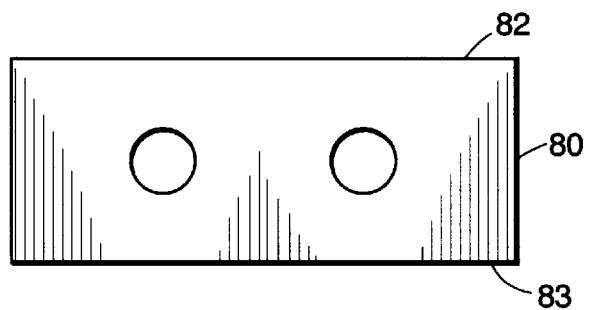
FIG. 7 is a front view of a knife element used in the example of FIG. 6.
Figure 8:
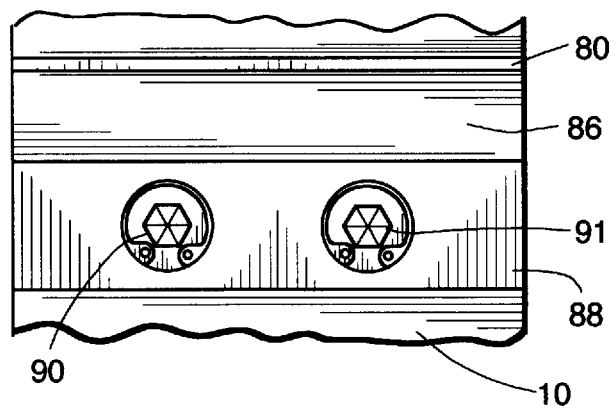
FIG. 8 is a top view of the tool example of FIGS. 6 and 7.
Figure 6:
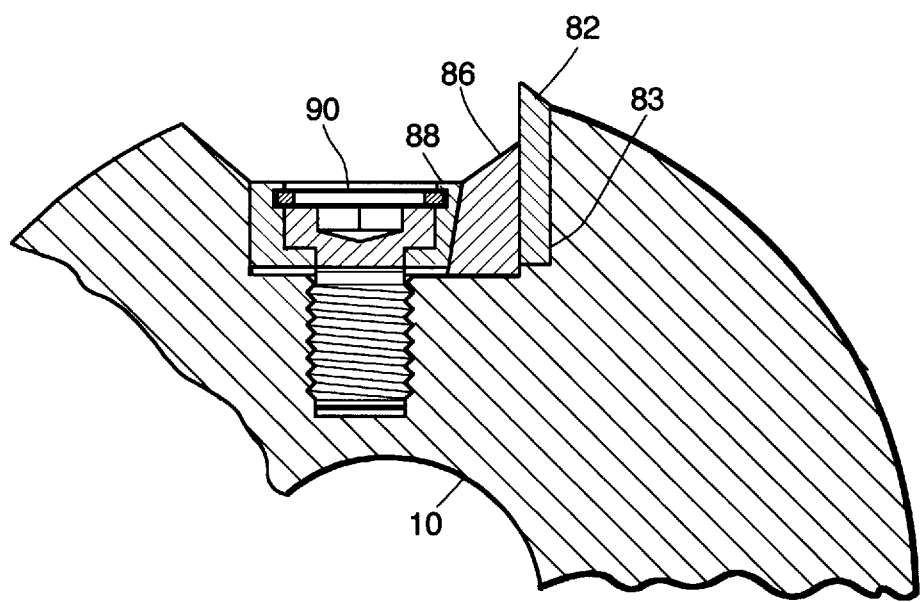
FIG. 6 is another example, shown in side cross-section, of a modified replaceable insert cutting tool in accordance with the invention.

As evidenced by the further example of FIGS. 6–8, the combination is adaptable enough to take advantage of a number of different properties and possibilities. The cutter head 10 is different in having a less indented pocket 80, although the knife support wall 26 and the back support wall 22 have a comparable spaced apart relation to that shown previously. Here the knife 82 is reversible, having opposite cutting edges 83, 84. This example is of a type widely used, in having a height of 12 mm, a thickness of 1.5 to 2 mm, and a length of up to 150 mm or more.

In this example, a single knife gib 86 which extends across the lateral dimension of the cutter body 10, is driven laterally against the knife 80 by a single pressure gib 88 having through holes for two spaced apart cap screws 90, 91. Equalization of forces exerted against the knife 80 is easily achieved because the cap screws are not widely separated and the torque difference is readily noticed if there is a small misalignment. It will be apparent to those skilled in the art that a single pressure gib may have three or more cap screws, as may be required by a greater lateral knife dimension.

Figure 9:
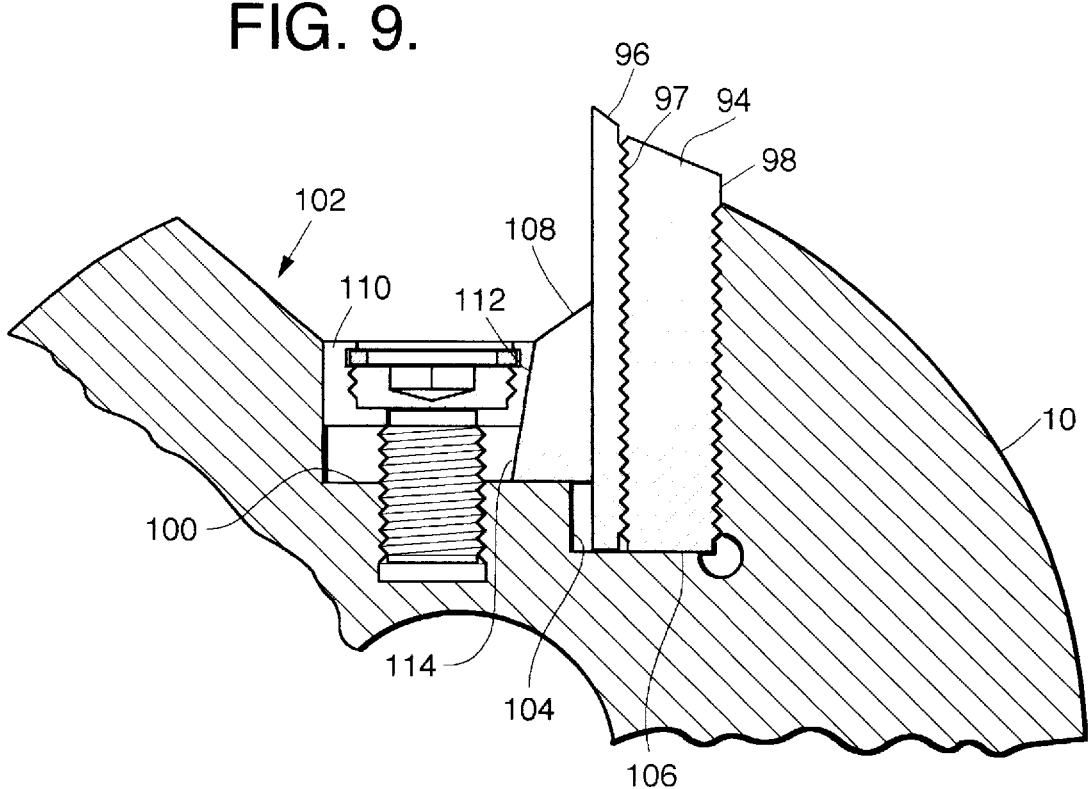
FIG. 9 is a side cross-sectional view of yet another example in accordance with the invention.

A number of different alternative features as shown in the alternative example of FIG. 9, in which a knife support plate 94 is interposed between the knife 96 and the knife support wall 26. Moreover, the surfaces are not planar but include mating corrugation patterns 97, 98 which constrain the knife 96 against radial movement relative to the cutter head 10. In this example also, the base wall 100 of the indentation 102 has a larger intermediate step 104, so that a base wall segment 106 receiving the knife gib 108, knife 96 and knife support plate 94 can have large load bearing surfaces. The pressure gib 110 angled wedge face 112 fully engages the mating face 114 of the knife gib 108 when the center of force is in the mid-region of the knife gib 108. This portion is at or close to the optimum for the design shown, but can be moved up or down relative to the knife 96 dependent upon dimensions and force loading considerations.

It will also be evident to those skilled in the art that in using a knife support plate the designer has the freedom to use knives of different styles and dimensions, while changing only two elements. In addition, the engaging surfaces can be in different combinations of planar and corrugated, as long as they mate properly.

Figure 10:
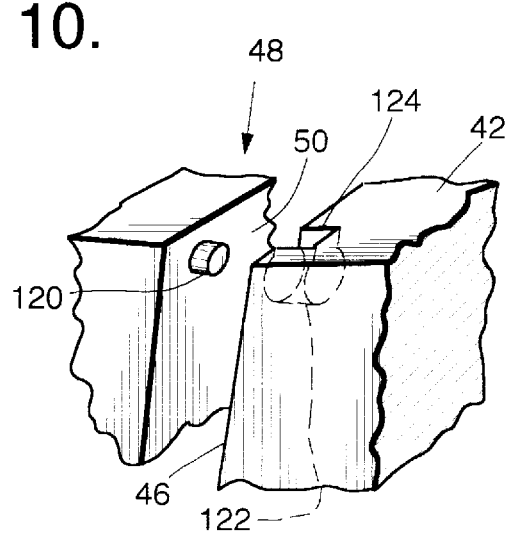
FIG. 10 is a fragmentary perspective view of a pressure gib and knife gib modification that limits initial movement during disassembly.

A further useful feature is shown in FIG. 10, wherein only facing portions of a pressure gib 48 and a knife gib 42 are shown. The angled face 50 of the pressure gib 48 includes a short retention pin 120 that protrudes, in assembly, into a shallow bore 122 in the mating angled face 46 of the knife gib 42. The shallow bore 122 is opened at the top by a slot 124 through which the pin 120 can fit. Therefore, when the cap screw (not shown in FIG. 10) is turned for release, the knife gib 42 is loose but cannot slide out prematurely because of the engaging pin 120.

Although a number of forms and variations in accordance with the invention have been shown, it will be appreciated that the invention is not limited thereto, but includes all modifications and alternatives within the scope of the appended claims.

I claim:

1. A replaceable insert cutting tool combination comprising:
   a cutter head having at least one peripheral transverse indentation and being rotatable about an axis, the indentation including a knife support wall at least partially transverse to the center head periphery, a back support wall substantially parallel and spaced apart from the knife support wall, and at least one threaded bore in the indentation and substantially parallel to the knife support wall;
   a knife element disposed adjacent the knife support wall and having an edge extending from the indentation;
   at least one threaded element for engagement in the threaded bore;
   at least a pair of wedging elements mounted adjacent the knife element in engaging side-by-side relation in the indentation, one of the wedging elements receiving the at least one threaded element and engaging the threaded element to be moveable inwardly toward the cutter head therewith, at least one of the wedging elements being positioned to move the knife element toward the knife support wall when the threaded element is increasingly engaged in the threaded bore; and
   wherein the at least a pair of wedging elements include complementary and engaging angled walls which urge the elements oppositely toward the indentation walls when the at least one threaded element is increasingly engaged into the threaded bore in the cutter head.

2. A combination as set forth in claim 1 above, wherein the at least one pair of wedging elements comprise a pressure gib and a knife gib, the knife gib angled wall diverging away from the knife edge and the pressure gib including an inset with a through hole for receiving the threaded element.

3. A combination as set forth in claim 2 above, including a lock element disposed in the pressure gib for restricting axial movement while permitting turning movement of the at least one threaded element.

4. A combination as set forth in claim 2 above, wherein the pressure gib includes a retention pin extending from the angled wall and the knife gib includes a bore for receiving the retention pin.

5. A combination as set forth in claim 1 above, wherein the combination further comprises a support element disposed between the knife element and the knife support wall and having faces engaging both and parallel to the knife support wall.

6. A combination as set forth in claim 5 above, wherein the engaging faces are corrugated.

7. A combination as set forth in claim 2 above, wherein the transverse indentation in the cutter head includes a base wall having a stepped portion, the knife and knife gib being disposed in the more deeply indented portion of the base wall.

8. A combination as set forth in claim 7 above, wherein the pressure gib and knife gib are angled and dimensioned such that at full engagement of the threaded element in the threaded bore, the pressure gib engages the knife gib in its midregion and is spaced apart from the base wall.

9. A combination as set forth in claim 2 above, wherein the knife element is reversible, with opposed cutting edges.

10. A combination as set forth in claim 2 above, wherein the wedging elements include at least two side-by-side pressure gibs and engaging threaded elements.

11. A combination as set forth in claim 2 above, wherein the wedging elements include a single pressure gib having at least two side-by-side threaded elements.

12. A replaceable insert cutting tool assembly for seating in a tool mounting opening in a cutter body having a base wall with a threaded bore and opposite side walls parallel to the plane of a tool to be inserted, comprising:
   a tool element having a planar body and at least one cutting edge thereon, the tool element being positioned against a first side wall of the opening;
   a pressure gib spaced apart from the tool element and including a first planar side wall flush against the second side wall of the opening, a second opposite planar side wall slanted toward the cutting edge of the tool element, and a cavity including a base opening aligned with the threaded bore;
   a tool gib disposed between the pressure gib and tool element and including a first planar side wall flush against the tool element and a second opposite planar side wall slanted away from the cutting edge of the tool element, the tool gib engaging the pressure gib and tool element; and
   a mounting screw extending though the cavity and the base opening in the pressure gib and engaging in the threaded bore in the cutter body while abutting a portion of the pressure gib to generate downward force converted by the engaging side walls of the pressure gib and tool gib into lateral forces acting on the tool element.

13. An assembly as set forth in claim 12 above, including in addition means in the tool element defining a positioning hole, a positioning pin in the side wall of the tool gib engaging the positioning hole in the tool element, and means defining a lock ring groove in the cavity in the pressure gib adjacent the upper edge of an inserted mounting screw, and a lock ring disposed in the lock ring groove and blocking egress of the mounting screw relative to the pressure gib.

14. An assembly as set forth in claim 13 above, wherein the mounting screw is a cap screw having a cap with a low height profile and an interior hexagonal socket, and wherein the interior base of the pressure gib cavity includes a seating surface engaging the underside of the cap of the cap screw.

15. An assembly as set forth in claim 14 above, wherein the base wall of the mounting opening has a step intermediate the side walls, and the tool element and tool gib have ends adjacent the portion of the base wall below the step and the pressure gib engages the portion of the base wall above the step.

16. A replaceable insert cutting tool arrangement for woodworking tools having peripheral pockets in which the cutting tools are to be inserted and interchanged, comprising:

means defining a cutting tool pocket having opposite substantially parallel side walls and a base, defining a cavity having leading and trailing edge sides in the tool, the base including a threaded bore;

a knife engageable against a trailing edge side wall of the pocket and having a cutting edge periphery extending outside the periphery of the tool;

the knife gib having a flat surface engaging the interior flat surface of the knife, and having a tapered planar face on the opposite side from the knife;

a pressure gib including a bore disposed about the threaded bore in the tool and having a first flat face engaging a leading edge side wall of the pocket and an angled planar side wall engaging the angled side wall of the knife gib, the angled face of the knife gib diverging in the direction away from the cutting edge;

a threaded member disposed within the bore in the pressure gib and including a surface engaging the pressure gib and a threaded portion engaging the threaded bore in the tool, whereby when the threaded member is tightened in the threaded bore, it urges the pressure gib in the same direction and the angled mating surfaces increase the lateral force against the knife to securely maintain position, while the threaded member can readily be loosened to allow release and interchange of the knife.

17. A replaceable cutting tool as set forth in claim 16 above, wherein the pressure gib includes an interior groove at the level of the top of the threaded member, and the combination further includes a lock ring disposed in the internal groove and seated to limit extraction of the threaded member.

18. A combination as set forth in claim 17 above, wherein the threaded member comprises a cap screw, having a socket head wherein the angle of the mating angled surfaces relative to the plane of the knife element is approximately 10° to 15°; wherein the base of the cutting tool pocket includes a step, and the pressure gib includes a seating face engaging the head of the cap screw, and wherein the angled engaging side walls of the pressure gib and knife gib include means for limiting release of the knife gib relative to the pressure gib.

19. A replaceable cutting tool assembly for a planar knife edge member to be held in a support body comprising the combination of:

a knife gib member having a planar face for engaging the knife member, and a planar angled face diverging outwardly relative to the knife-engaging face in the direction away from the knife edge;

a threaded securement member engaging into the support body along an axis parallel to the plane of the knife and in a direction away from the knife edge; and a pressure gib having an angled side face engageable against the angled face of the knife gib and including a bore for receiving the threaded securement member, and a seating surface for engaging the securement member, such that threading of the securement member in the direction away from the knife edge converts the downward wedging force of the securement member into a sidewise engagement force from the engaging angled side faces against the knife gib and the knife to maintain the knife in position in the body.

* * * * *